(12) United States Patent
Minemura et al.

(10) Patent No.: US 10,723,346 B2
(45) Date of Patent: *Jul. 28, 2020

(54) VEHICLE CONTROL APPARATUS AND VEHICLE CONTROL METHOD

(71) Applicant: DENSO CORPORATION, Kariya, Aichi-pref. (JP)

(72) Inventors: Akitoshi Minemura, Kariya (JP); Yosuke Ito, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 278 days.

This patent is subject to a terminal disclaimer.

(21) Appl. No.: 15/576,528

(22) PCT Filed: May 11, 2016

(86) PCT No.: PCT/JP2016/063986
§ 371 (c)(1),
(2) Date: Nov. 22, 2017

(87) PCT Pub. No.: WO2016/190103
PCT Pub. Date: Dec. 1, 2016

(65) Prior Publication Data
US 2018/0154889 A1 Jun. 7, 2018

(30) Foreign Application Priority Data

May 27, 2015 (JP) .................. 2015-107903

(51) Int. Cl.
*B60W 30/09* (2012.01)
*B60R 21/0134* (2006.01)
(Continued)

(52) U.S. Cl.
CPC ......... *B60W 30/09* (2013.01); *B60K 31/0008* (2013.01); *B60R 21/0134* (2013.01);
(Continued)

(58) Field of Classification Search
CPC ...... B60W 30/09; B60W 10/18; B60W 10/20; B60W 2550/10; B60K 31/0008;
(Continued)

(56) References Cited

U.S. PATENT DOCUMENTS 9,460,627 B2 * 10/2016 Minemura ............... G08G 1/16
9,522,701 B2 * 12/2016 Shin .................... B62D 15/0295
(Continued)

FOREIGN PATENT DOCUMENTS

| JP | 2003-151096 A | 5/2003 |
|----|---------------|--------|
| JP | 2004-268829 A | 9/2004 |
| JP | 2014-067169 A | 4/2014 |

*Primary Examiner* — Nicholas Kiswanto
(74) *Attorney, Agent, or Firm* — Maschoff Brennan

(57) ABSTRACT

A vehicle control apparatus calculates a position at which a distance between a pedestrian and the own vehicle becomes zero in a travelling direction of the own vehicle as a predicted collision position. The vehicle control apparatus determines whether the pedestrian is crossing a course of the own vehicle. The vehicle control apparatus sets a limit value indicating a width of a determination region in a lateral direction perpendicular to the travelling direction of the own vehicle, and determines whether the pedestrian is present within the course of the own vehicle based on the predicted collision position and the limit value. The vehicle control apparatus sets one of a left and right limit values of a determination region in which the predicted collision position is present in the travelling direction of the own vehicle to be greater than the limit value of the other.

7 Claims, 4 Drawing Sheets

(51) Int. Cl.
*B60K 31/00* (2006.01)
*B60T 7/12* (2006.01)
*B60T 7/22* (2006.01)
*G08G 1/16* (2006.01)
*B60W 10/18* (2012.01)
*B60W 10/20* (2006.01)

(52) U.S. Cl.
CPC *B60T 7/12* (2013.01); *B60T 7/22* (2013.01); *G08G 1/163* (2013.01); *G08G 1/166* (2013.01); *B60T 2201/024* (2013.01); *B60W 10/18* (2013.01); *B60W 10/20* (2013.01); *B60W 2554/00* (2020.02)

(58) Field of Classification Search
CPC ......... B60R 21/0134; B60T 7/12; B60T 7/22; G08G 1/163; G08G 1/166
See application file for complete search history.

(56) References Cited

U.S. PATENT DOCUMENTS

| | | | |
|---|---|---|---|
| 10,252,715 B2* | 4/2019 | Minemura | B60W 10/20 |
| 2013/0013184 A1 | 1/2013 | Morotomi et al. | |
| 2018/0312163 A1* | 11/2018 | Minemura | G01S 13/867 |

* cited by examiner

VEHICLE CONTROL APPARATUS AND VEHICLE CONTROL METHOD

CROSS-REFERENCE TO RELATED APPLICATION

This application is based on and claims the benefit of priority from earlier Japanese Patent Application No. 2015-107903 filed on May 27, 2015, the description of which is incorporated herein by reference.

TECHNICAL FIELD

The present disclosure relates to a vehicle control technique for determining whether a target is present within the course of the own vehicle and controlling the vehicle based on the result of the determination.

A pre-crash safety (PCS) system has been developed that reduces or prevents damage from a collision between the own vehicle and a target such as another vehicle, a pedestrian or a road structure, located ahead of the own vehicle in the traveling direction. The PCS system calculates time to collision (TTC), which is an estimate of the time remaining until the own vehicle collides with a target, based on the relative distance and relative velocity or relative acceleration between the own vehicle and the target. Based on the calculated TTC, the PCS system, for example, uses a notification device or the like to notify the own vehicle's driver that the own vehicle is approaching the target, or activates a braking device in the own vehicle.

A vehicle control apparatus disclosed in PTL 1 relates to the PCS system. According to the vehicle control apparatus of PTL 1, a determination zone set based on the maximum moving velocity of a pedestrian is provided outside a determination zone set based on the predicted path of the own vehicle. If the pedestrian is present in the determination zone, the vehicle control apparatus determines that the own vehicle is likely to collide with the pedestrian with high probability.

CITATION LIST

Patent Literature

[PTL 1] JP 2004-268829 A

SUMMARY OF THE INVENTION

Technical Problem

The vehicle control apparatus of PTL 1 sets the determination zone based on the maximum moving velocity of a pedestrian. Therefore, the vehicle control apparatus often determines that the own vehicle collides with the pedestrian with high probability, regardless of whether the pedestrian moves with high or low probability of a collision. Accordingly, the determination zone is set to be increased even though the pedestrian actually moves with low probability of a collision. In this case, a safety device may be unnecessarily activated (may be activated when not required to be activated).

The present disclosure has an object of providing a vehicle control apparatus that accurately determines whether a pedestrian is present within the course of the own vehicle, and a method of controlling a vehicle executed by the vehicle control apparatus.

Solution to Problem

A vehicle control apparatus of the present disclosure includes a target information acquiring unit, a predicted collision-position calculating unit, a crossing determining unit, and a limit value setting unit, and a presence determining unit. The target information acquiring unit (12) acquires a current position of a pedestrian present ahead of an own vehicle in a traveling direction, the current position being a position relative to the own vehicle. The predicted collision-position calculating unit (14) calculates a position at which a distance between the pedestrian and the own vehicle becomes zero in a travelling direction of the own vehicle as a predicted collision position based on the current position. The crossing determining unit (15) determines whether the pedestrian is crossing a course of the own vehicle. The limit value setting unit (16) sets a limit value indicating a width of a determination region in a lateral direction perpendicular to the travelling direction of the own vehicle in a determination region for determining whether the pedestrian is present within the course of the own vehicle. The presence determining unit (17) determines whether the pedestrian is present within the course of the own vehicle based on the predicted collision position and the limit value. In the vehicle control apparatus, the limit value setting unit corrects one of a left and right limit values of a determination region in which the predicted collision position is present in the travelling direction of the own vehicle to be greater than the limit value of another side to perform an increase process for increasing a width of the determination region when it has been determined that the pedestrian is crossing the course of the own vehicle.

A pedestrian crossing (moving across) the course of the own vehicle may suddenly change his/her moving velocity due to, for example, stopping in the course of the own vehicle or the like when laterally moving from the vicinity of the front of the own vehicle (the vicinity of the position ahead of the own vehicle in the traveling direction). In such cases, it is difficult for the driver to avoid a collision with the pedestrian by a steering operation or the like. With the above configuration, one of the left and right limit values that limits the width of a determination region to which the pedestrian is moving is corrected to be a greater value (increase correction) to increase the determination region when the pedestrian crosses ahead of the own vehicle in the traveling direction. Accordingly, with the vehicle control apparatus of the present disclosure, the pedestrian having a high risk of a collision with the own vehicle is determined with high probability (is likely to be determined) as a pedestrian present within the course of the own vehicle.

However, when the pedestrian moves ahead of the own vehicle in the traveling direction but does not cross the course of the own vehicle, the driver can easily avoid a collision with the pedestrian by a steering operation. Alternatively, the pedestrian may take on the behavior of avoiding a collision with the own vehicle. In such cases, the detection by the vehicle control apparatus that the pedestrian is present within the course of the own vehicle may result in an unnecessary (excessive) detection of the presence of the pedestrian. Therefore, the aforementioned configuration performs the process for increasing the width of the determination region (correction for increasing the limit value) only when the pedestrian crosses the course of the own vehicle. Accordingly, with the vehicle control apparatus of the present disclosure, a pedestrian having a low risk of a collision with the own vehicle is determined with low probability (is less likely to be determined) as a pedestrian present within the course of the own vehicle.

The vehicle control apparatus of the present disclosure is configured to set a condition where the process for increasing the width of the determination region (correction for increasing the limit value) is performed, thereby improving the accuracy of determining whether the pedestrian is present within the course of the own vehicle.

DESCRIPTION OF THE EMBODIMENTS

Figure 1:
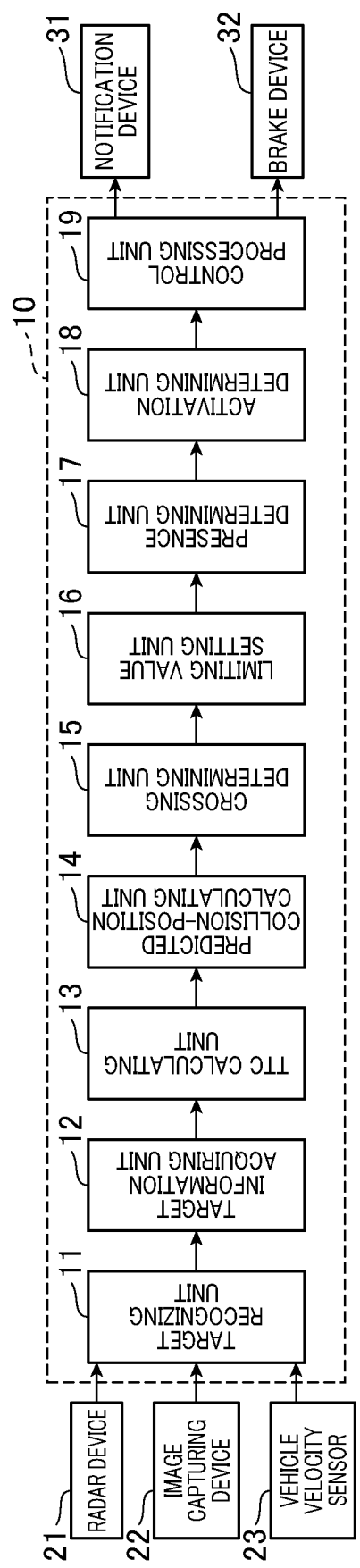
FIG. 1 is a configuration diagram illustrating a vehicle control apparatus of a first embodiment.

Some embodiments will be described hereinafter with reference to the drawings. The same or equivalent parts in the embodiments described below are assigned with the same reference signs in the drawings, and a duplicated description should be omitted regarding those parts which are assigned with the same reference signs.

First Embodiment

A vehicle control apparatus according to the present embodiment is mounted on a vehicle (own vehicle) and detects a target present around the own vehicle such as ahead of the own vehicle in the traveling direction. The vehicle control apparatus then performs control for avoiding a collision between the detected target and the own vehicle or reducing damage from a collision. Thus, the vehicle control apparatus according to the present embodiment functions as a pre-crash safety (PCS) system.

FIG. 1 is a configuration diagram illustrating the vehicle control apparatus of the present embodiment. As illustrated in FIG. 1, a driving assist ECU 10, which is the vehicle control apparatus according to the present embodiment is a computer including a CPU, a memory (e.g., a ROM and a RAM), I/O, and the like. The driving assist ECU 10 has functions of a target recognizing unit 11, a target information acquiring unit 12, a TTC calculating unit 13, and a predicted collision-position calculating unit 14, a crossing determining unit 15, a limit value setting unit 16, a presence determining unit 17, an activation determining unit 18 and a control processing unit 19. The driving assist ECU 10 realizes each of the functions by causing the CPU to execute, for example, a program installed in the ROM.

The driving assist ECU 10 is connected to sensor devices which input various types of detection information. Examples of the sensor devices to be connected to the driving assist ECU 10 include a radar device 21, an image capturing device 22, a vehicle velocity sensor 23, and the like.

The radar device 21 is, for example, a millimeter wave radar which transmits, as probe waves, a high frequency signal in a millimeter wave band. The radar device 21 is provided to a front end of the own vehicle. The radar device 21 sets, as a detectable region for a target, a region extending over a predetermined angular range, and detects the position of a target in the detectable region. Specifically, the radar device 21 transmits probe waves at a predetermined control cycle and receives reflected waves via a plurality of antennas. Based on a transmission time of the probe waves and a reception time of the reflected waves, the radar device 21 calculates a distance to the target which has reflected the probe waves. The reflected waves reflected by the target have a frequency that changes due to the Doppler effect. Accordingly, based on the frequency of the reflected waves that has changed, the radar device 21 calculates a velocity relative to the target which has reflected the probe waves. Based on a phase difference of the reflected waves received via the plurality of antennas, the radar device 21 further calculates an azimuth of the target which has reflected the probe waves. In the case where the position and the azimuth of the target can be calculated, the position of the target relative to the own vehicle can be specified. The radar device 21 cyclically transmits probe waves, receives reflected waves, and calculates a position and a velocity of the target relative to the own vehicle. The radar device 21 then transmits the calculated relative position and relative velocity per unit time, to the driving assist ECU 10.

The image capturing device 22 is, for example, a CCD camera, a CMOS image sensor, a near infrared camera, or the like. The image capturing device 22 is provided at a predetermined level at the center of the width direction of the own vehicle. The image capturing device 22 captures, from a bird's-eye view, an image of a region extending over a predetermined angular range ahead of the own vehicle. From the captured image, the image capturing device 22 extracts a characteristic point indicating the presence of a target. Specifically, the image capturing device 22 extracts an edge point based on brightness information of the captured image, and performs Hough Transform with respect to the edge point thus extracted. In the Hough Transform, for example, a point on a straight line along which a plurality of edge points are continuously arranged, or a point at which straight lines intersect with each other is extracted as a characteristic point. The image capturing device 22 captures an image and extracts a characteristic point for each control cycle that is the same as or different from that of the radar device 21. The image capturing device 22 then transmits a result of the extraction of the characteristic point to the driving assist ECU 10. The vehicle velocity sensor 23 is provided to a rotary shaft which transmits motive power to a wheel of the own vehicle. The vehicle velocity sensor 23 detects a velocity of the own vehicle based on the number of rotations of the rotary shaft. The vehicle velocity sensor 23 then transmits a result of the detection of the velocity to the driving assist ECU 10.

The own vehicle includes a notification device 31, a brake device 32, and the like as various safety devices each of which is driven by control commands provided from the driving assist ECU 10.

The notification device 31 is, for example, a loudspeaker, a display, or the like that is provided in the interior of the own vehicle. If the driving assist ECU 10 determines that there is a possibility that the own vehicle will collide with a target, the notification device 31 notifies the driver of a risk of collision by outputting, for example, an alarm sound, and/or an alarm message, based on a control command provided from the driving assist ECU 10.

The brake device 32 applies brakes to the own vehicle. If the driving assist ECU 10 determines that there is a possibility that the own vehicle will collide with a target, the brake device 32 is activated based on a control command provided from the driving assist ECU 10. Specifically, the brake device 32 increases a braking force that is generated in response to the driver's braking operation, or in the absence of the driver's braking operation, the brake device 32 applies automatic braking. That is, the brake device 32 provides the driver with a brake assist function and an automatic brake function.

The functional part of the driving assist ECU 10 will be described below. The target recognizing unit 11 of the present embodiment acquires a first detection information (result of calculation of a position) from the radar device 21. Further, the target recognizing unit 11 acquires a second detection information (result of extraction of a characteristic point) from the image capturing device 22. The target recognizing unit 11 then correlates a first position information indicated by the position obtained from the first detection information, with second position information indicated by the characteristic point obtained from the second detection information, in the following manner. The target recognizing unit 11 correlates detection information positioned in the vicinity with each other as position information of the same target. If the position indicated by the second position information item is present close to the position indicated by the first position information, the target may be actually present at the position indicated by the first position information. The state of achieving such an accurate acquisition of the position of the target with the radar device 21 and the image capturing device 22 is referred to as "fusion state." The target recognizing unit 11 determines whether the target that has been determined to be in the fusion state (target for which the first position information has been correlated with the second position information) is continuously in the fusion state with reference to the detection history (previously detected position) of the target. Consequently, if the target is determined to be in the fusion state, the target recognizing unit 11 determines that the target is present at the acquired position. Further, if the target determined to be continuously in the fusion state is not detected, the target recognizing unit 11 refers to the detection history of the target. Consequently, the target recognizing unit 11 considers that the target has been present at the previously detected position for a predetermined period.

The target recognizing unit 11 performs pattern matching with respect to the target, which has been determined to be in the fusion state. Specifically, the target recognizing unit 11 performs pattern matching with respect to the second detection information with use of pattern data that has been prepared in advance for each possible target type. The target recognizing unit 11 then determines whether the determined target is a vehicle or a pedestrian, based on the result of the pattern matching, and correlates the result of the determination with the target type. In the present embodiment, a concept of the pedestrian may include a bicycle rider.

The target information acquiring unit 12 acquires the position and the velocity of the target relative to the own vehicle based on the information (first position information) obtained from the target recognizing unit 11, and then correlates the acquired position and velocity relative to the own vehicle as target information (for each target). The relative position includes a lateral position that is a position of a target relative to the own vehicle in a lateral direction perpendicular to the traveling direction of the own vehicle and a longitudinal position that is a position of a target relative to the own vehicle in a longitudinal direction that is the traveling direction of the own vehicle. Based on the acquired target information (relative position and the relative velocity), the target information acquiring unit 12 calculates a lateral velocity that is a velocity of a target relative to the own vehicle in a lateral direction perpendicular to the traveling direction of the own vehicle and a longitudinal velocity that is a velocity of a target relative to the own vehicle in a longitudinal direction that is the traveling direction of the own vehicle.

The target information acquiring unit 12 further identifies the type of target according to the type of the target (results of the determination of the target) obtained from the target recognizing unit 11 and according to the lateral velocity and longitudinal velocity (relative velocity).

For example, if the target type is determined to be a vehicle, a vehicle type can be further identified as follows. The target information acquiring unit 12 identifies four vehicle types based on the longitudinal velocity and the lateral velocity. Specifically, the target information acquiring unit 12 identifies a preceding vehicle, which is traveling ahead of the own vehicle in the traveling direction of the own vehicle, and an oncoming vehicle, which is traveling ahead of the own vehicle in a direction opposite to the traveling direction of the own vehicle (traveling in an oncoming lane). Furthermore, the target information acquiring unit 12 identifies a stationary vehicle (stopped vehicle or parked vehicle), which stands still ahead of the own vehicle in the traveling direction of the own vehicle, and a passing vehicle, which is passing across ahead of the own vehicle in the traveling direction of the own vehicle.

If the target type is determined to be a pedestrian, a pedestrian type can be further identified as follows. The target information acquiring unit 12 identifies four pedestrian types based on the longitudinal velocity and the lateral velocity. Specifically, the target information acquiring unit 12 identifies a preceding pedestrian who is walking ahead of the own vehicle in the traveling direction of the own vehicle, and an oncoming pedestrian who is walking ahead of the own vehicle in a direction opposite to the traveling direction of the own vehicle. Furthermore, the target information acquiring unit 12 identifies a stationary pedestrian who stands still ahead of the own vehicle in the traveling direction of the own vehicle, and a crossing pedestrian who is crossing (passing across) ahead of the own vehicle in the traveling direction of the own vehicle.

For a target which has been detected only based on the first detection information, the target type can be further identified as follows. The target information acquiring unit 12 identifies four target types based on the longitudinal velocity of a target. Specifically, the target information acquiring unit 12 identifies a preceding target, which is moving ahead of the own vehicle in the traveling direction of the own vehicle, and an oncoming target, which is moving ahead of the own vehicle in a direction opposite to the traveling direction of the own vehicle. Furthermore, the target information acquiring unit 12 identifies a stationary target, which is standing still ahead of the own vehicle in the traveling direction of the own vehicle, and a passing target, which is passing across ahead of the own vehicle in the traveling direction of the own vehicle.

The TTC calculating unit 13 of the present embodiment calculates a time to collision, which is a predicted time until the own vehicle collides with the target. That is, the TTC calculating unit 13 calculates a time to collision, which is predicted time until the relative distance (distance in the longitudinal direction) between the own vehicle and the target becomes zero is calculated, as a time to collision. Specifically, the TTC calculating unit 13 calculates the time to collision by dividing the relative distance between the own vehicle and the target by the relative velocity of the target relative to the own vehicle. The time to collision may be calculated by using an acceleration of the target relative to the own vehicle. In this case, assuming that the own vehicle is approaching the target with uniform acceleration, the TTC calculating unit 13 calculates the time to collision.

The predicted collision-position calculating unit 14 of the present embodiment stores the acquired position history of the target over a predetermined time period to make a position history record of the target. The predicted collision-position calculating unit 14 estimates a movement path of the target based on the position history record of the target, and then calculates a predicted collision position that is a position at which the target is predicted to collide with the own vehicle. That is, when the target is, for example, a pedestrian, the predicted collision-position calculating unit 14 calculates the lateral position at which the relative distance (distance in the longitudinal direction) between the pedestrian and the own vehicle becomes zero, as a predicted collision position. Specifically, the predicted collision-position calculating unit 14 estimates a movement path of the target based on the previous positions of the target, which have been recorded as the position history, and a current position of the target. In this case, the predicted collision-position calculating unit 14 calculates an approximate straight line indicating a predicted course of the target based on the position history of the target, and estimates a movement path of the target by setting the calculated approximate straight line as a movement path of a position of the target relative to the own vehicle. Then, assuming that the target moves along the estimated movement path (calculated approximate straight line), the predicted collision-position calculating unit 14 calculates a lateral position of a point where the longitudinal position (relative distance) between the front end of the own vehicle and the target is zero in the approximate straight line, as a predicted collision position. The movement path to be estimated may be an approximate straight line, which passes through the current position of the target.

The crossing determining unit 15 of the present embodiment determines whether the pedestrian is crossing (moving across) ahead of the own vehicle in the traveling direction (course) of the own vehicle. Specifically, the crossing determining unit 15 determines whether a line segment (predicted course of the pedestrian) connecting the current position of the pedestrian and the predicted collision position, intersects with the course of the own vehicle. Consequently, when the line segment indicating the predicted course of the pedestrian intersects with the course of the own vehicle, the crossing determining unit 15 determines that the pedestrian is crossing ahead of the own vehicle in the travelling direction of the own vehicle. The course of the own vehicle used for the above determination is calculated as follows, for example. The crossing determining unit 15 extracts a lane separator line such as a white line on a road from the image capturing device 22. Then the crossing determining unit 15 calculates the path of the central position relative to the position of the own vehicle in the left and right direction (a position of a lateral side) based on the curvature of the extracted lane separator line, and sets the calculated path as the course of the own vehicle. It should be noted that the predicted course of the pedestrian intersects with the course of the own vehicle means that the current position of the pedestrian is present on one of the left and right sides in the lateral direction that is perpendicular to the travelling direction of the own vehicle, and the predicted collision position is present on the other side. Therefore, the crossing determining unit 15 may determine whether the pedestrian is crossing ahead of the own vehicle in the traveling direction based on the above positional relationship between the current position of the pedestrian and the predicted collision position (which of the left or right side the pedestrian or the predicted collision position is present in).

Figure 2:
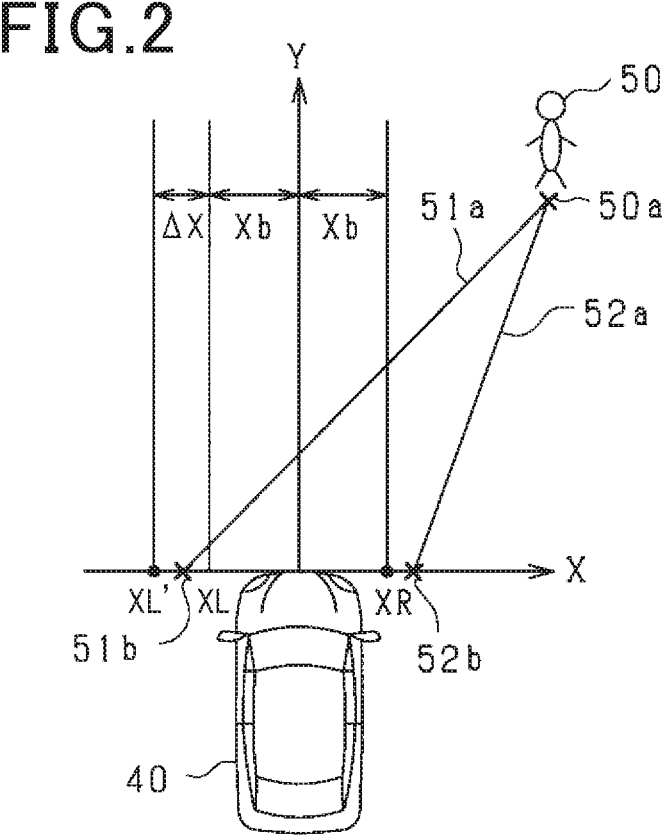
FIG. 2 is a diagram illustrating a predicted course of a pedestrian and a process for correcting a limit value to a greater value (process for increasing the width of a determination region) in the first embodiment.

The limit value setting unit 16 of the present embodiment sets a limit value indicating the width of a region in the lateral direction perpendicular to the course of the own vehicle. The limit value limits the width of a determination region (determination region width) for determining whether the target is present within the course of the own vehicle. Thus, if the presence determining unit 17 described later determines that the lateral position of the target is in the determination region (within the limit value), the driving assist ECU 10 determines that the target is present within the course of the own vehicle. With reference to FIG. 2, the limit value will be described. In FIG. 2, the lateral direction perpendicular to the traveling direction of an own vehicle 40 is referred to as an x-axis in which the right direction from the center axis of the own vehicle 40 is set to be positive. Further, the longitudinal direction that is the traveling direction of the own vehicle 40 is referred to as a y-axis in which the forward direction of the own vehicle 40 is set to be positive. That is, the y-axis is a straight line passing through the center of the own vehicle 40 (hereinafter referred to as the "center axis"), and corresponds to the course of the own vehicle 40. The limit value setting unit 16 sets the limit value that limits the width of the determination region of the course of the own vehicle 40 in right direction based on a rightward limit value XR. Further, the limit value setting unit 16 sets the limit value that limits the width of the determination region of the course of the own vehicle 40 in left direction based on a leftward limit value XL. Thus, the limit value setting unit 16 sets the determination region as shown in FIG. 2 to be ahead of the own vehicle 40 in traveling direction based on the rightward limit value XR and the leftward limit value XL. Consequently, the determination region set by the limit value setting unit 16 has a predetermined lateral width, which is based on the rightward limit value XR, extending ahead of the own vehicle 40 from the center axis of the own vehicle 40 to a right side with respect to the traveling direction of the own vehicle 40. Further, the determination region set by the limit value setting unit 16 has a predetermined lateral width, which is based on the leftward limit value XL, extending ahead of the own vehicle 40 from the center axis of the own vehicle 40 to a left side with respect to the traveling direction of the own vehicle 40. The rightward limit value XR and the leftward limit value XL are set for each target type in advance. Therefore, the limit value setting unit 16 sets the rightward limit value XR and the leftward limit value XL based on the target type. If a plurality of the targets are present, the limit value setting unit 16 sets the rightward limit value XR and the leftward limit value XL for each target.

If the target is a pedestrian 50, and the pedestrian 50 is crossing ahead of the own vehicle 40 in the travelling direction, the limit value setting unit 16 corrects the limit value of the determination region opposite to the region at which the pedestrian 50 is located to a greater value to perform the process for increasing the width of the determination region. That is, if the pedestrian 50 is located at the right side relative to the course of the own vehicle 40 (y-axis), the limit value setting unit 16 corrects the leftward limit value XL to a greater value to perform the process for increasing the width of the left side determination region. On the other hand, if the pedestrian 50 is located at the left side relative to the course of the own vehicle 40, the limit value setting unit 16 corrects the rightward limit value XR to a greater value to perform the process for increasing the width of the right side determination region.

Specifically, the limit value setting unit 16 performs the following process (process for increasing the width of the determination region) to the limit value. First, it is assumed that the rightward limit value XR and the leftward limit value XL in the normal state are referred to as reference values Xb. The reference value Xb is a value determined in advance. When the limit value setting unit 16 corrects the limit value to increase the width of the determination region, the limit value setting unit 16 adds a correction value ΔX indicating an increased width of the determination region to the reference value Xb to correct the limit value to a value greater than that of the normal state (hereinafter, may be referred to as the "increase correction" for the sake of convenience). Specifically, the limit value setting unit 16 performs the above correction to the limit value of the determination region opposite to the region at which the pedestrian 50 is located (region at which the predicted collision position is located) to increase the determination area (to perform increase process) by resetting the limit value, which has been corrected. FIG. 2 illustrates an exemplary process for correcting the leftward limit value XL to a greater value (exemplary process for increasing the width of the determination region) when the pedestrian 50 is determined to be located at the right side relative to the center axis of the own vehicle 40. In such cases, the limit value setting unit 16 calculates the corrected leftward limit value XL' by adding the correction value ΔX to the leftward limit value XL of the normal state (XL'=XL+ΔX), and sets the calculated limit value XL' as the new limit value. In this case, the rightward limit value XR is not corrected to be increased. Therefore, the rightward limit value XR becomes equal to the reference value Xb. As shown in FIG. 2, if a predicted course 51a of the pedestrian 50 intersects with the course of the own vehicle 40 (y-axis), and the pedestrian 50 moves towards a predicted collision position 51b from a current position 50a, the leftward limit value XL is corrected to be increased (is subjected to the process for increasing the left side width of the determination region). Consequently, the predicted collision position 51b is in the determination region (within the limit value). However, if a predicted course 52a of the pedestrian 50 does not intersect with the course of the own vehicle 40 (y-axis), and the pedestrian 50 moves towards a predicted collision position 52b from a current position 50a, the leftward limit value XL is not corrected to be increased. Consequently, the predicted collision position 52b is outside the determination region (outside the limit value).

That is, the limit value setting unit 16 performs the process for increasing the determination region when the pedestrian 50 crosses ahead of the own vehicle 40 in the traveling direction, and has a high risk of a collision with the own vehicle 40. Consequently the pedestrian 50 is detected with high probability (is likely to be detected) as a pedestrian present within the course of the own vehicle 40. Thus, the vehicle control apparatus (driving assist ECU 10) of the present embodiment increases the ease of activation of the safety device to prevent the safety device from not being activated when required to be activated. However, the limit value setting unit 16 does not perform the process for increasing the determination region when the pedestrian 50 does not cross ahead of the own vehicle 40 in the traveling direction, and has a low risk of collision with the own vehicle 40. Consequently, the pedestrian 50 is detected with low probability (is less likely to be detected) as a pedestrian present within the course of the own vehicle 40. Thus, the vehicle control apparatus (driving assist ECU 10) of the present embodiment decreases the ease of activation of the safety device to prevent the safety device from being activated when not required to be activated.

Figure 3:
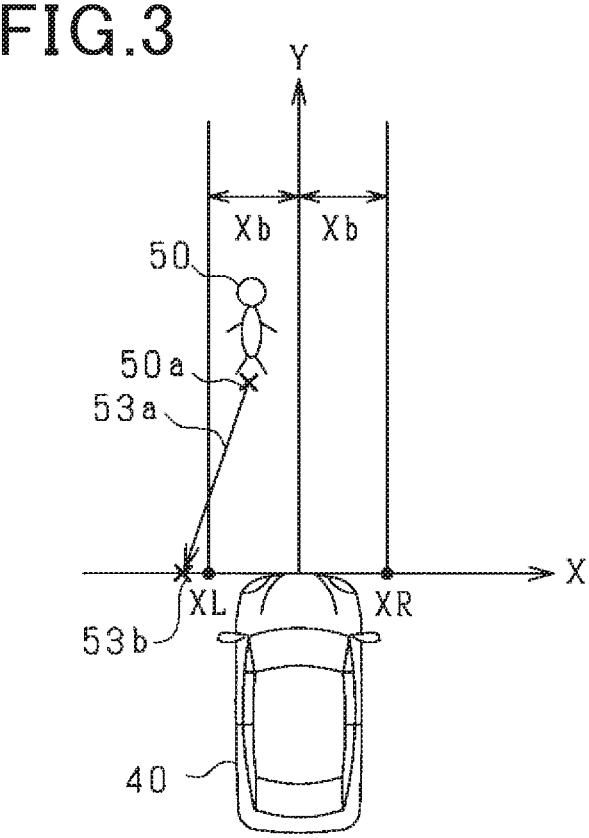
FIG. 3 is a diagram illustrating the case of terminating the increase process in the first embodiment.

FIG. 3 shows an example in which the limit value setting unit 16 terminates the above increase process (correction for increasing the limit value). As shown in FIG. 3, it is assumed that the pedestrian 50 continues to cross ahead of the own vehicle 40 in the traveling direction, and therefore a predicted course 53a of the pedestrian 50 does not intersect with the course of the own vehicle 40 (y-axis), for example. In such cases, the driver can easily avoid a collision between the own vehicle 40 and the pedestrian 50 by a steering operation. Alternatively, the pedestrian 50 may take on the behavior of avoiding a collision with the own vehicle. In this case, if the above increase process is continuously performed, the predicted collision position 53b may be in the determination region (within the limit value), resulting in an unnecessary activation of the safety device. Accordingly, if the limit value setting unit 16 determines that the pedestrian 50 is not crossing ahead of the own vehicle 40 in the traveling direction again after the limit value setting unit 16 determines that the pedestrian 50 is crossing ahead of the own vehicle 40 in the traveling direction, the limit value setting unit 16 terminates the above increase process.

The presence determining unit 17 of the present embodiment determines whether the target is present within the course of the own vehicle 40 based on the predicted collision position of the target and the limit value of the determination region. First, the presence determining unit 17 uses the rightward limit value XR and the leftward limit value XL which have been set by the limit value setting unit 16 for comparison with the predicted collision positions of the target. Consequently, if the predicted collision position of the target is located in the determination region (in the range of the limit value), the presence determining unit 17 determines that the predicted collision position is located inside the determination region (inside the limit value), thereby determining that the target is present within the course of the own vehicle 40. However, if the predicted collision position of the target is located outside the determination region (outside of the range of the limit value), the presence determining unit 17 determines that the predicted collision position is located outside the determination region (outside the limit value), thereby determining that the target is not present within the course of the own vehicle 40. Specifically, if the predicted collision position of the target is present in the rightward direction from the center axis of the own vehicle 40, the presence determining unit 17 determines that the predicted collision position of the target is in a right side determination region (in the range of the rightward limit value XR) unless an absolute value of the predicted collision position is less than the rightward limit value XR. Further, if the predicted collision position of the target is present in the leftward direction from the center axis of the own vehicle 40, the presence determining unit 17 determines that the predicted collision position of the target is in a left side determination region (in the range of the leftward limit value XL) unless the absolute value of the predicted collision position is less than the leftward limit value XL.

The activation determining unit 18 of the present embodiment determines whether to activate the safety device based on a predetermined timing of activation of the safety device and the calculated TTC. First, the activation determining unit 18 uses the predetermined activation timing of the safety device for comparison with TTC, which has been calculated by the TTC calculation unit 13. Thus, the activation determining unit 18 determines whether the TTC has reached the timing of activation of the safety device (whether the TTC is not more than the timing of activation of the safety device). Consequently, if the TTC has reached the timing of activation of the safety device (if the TTC is not more than the timing of activation of the safety device), the activation determining unit 18 determines that the safety device is to be activated. If the TTC has not reached the timing of activation of the safety device (if the TTC is more than the timing of activation of the safety device), the activation determining unit 18 determines that the safety device is not to be activated. Determining to activate the safety device, the activation determination unit 18 transmits the result of the determination (activation determination signal) to the control processing unit 19 to instruct the control of the safety device to be activated. The timing of activation of the safety device is set in advance for each safety device, such as the notification device 31 and the brake device 32. Specifically, for example, the timing of activation of the notification device 31 is set such that the notification device 31 is activated at the earliest stage among the other safety devices. This is because if the driver notices a collision risk by being notified by the notification device 31 and depresses a brake pedal, it is possible to avoid a collision without control commands provided from the driving assist ECU 10 to the brake device 32. In regard to the brake device 32, a timing of activation is set for each of the brake assist function and the automatic brake function of the brake device 32. The timings of activation of the notification device 31 and the brake device 32 can be the same values or different values.

The control processing unit 19 of the present embodiment controls activation of the safety device. The control processing unit 19 transmits a control signal to the safety device to be activated based on the result of the determination received from the activation determining unit 18. This causes the safety device to be activated. Thus, in the driving assist ECU 10, the activation determining unit 18 and the control processing unit 19 cooperate with each other to control activation of the safety device.

Figure 4:
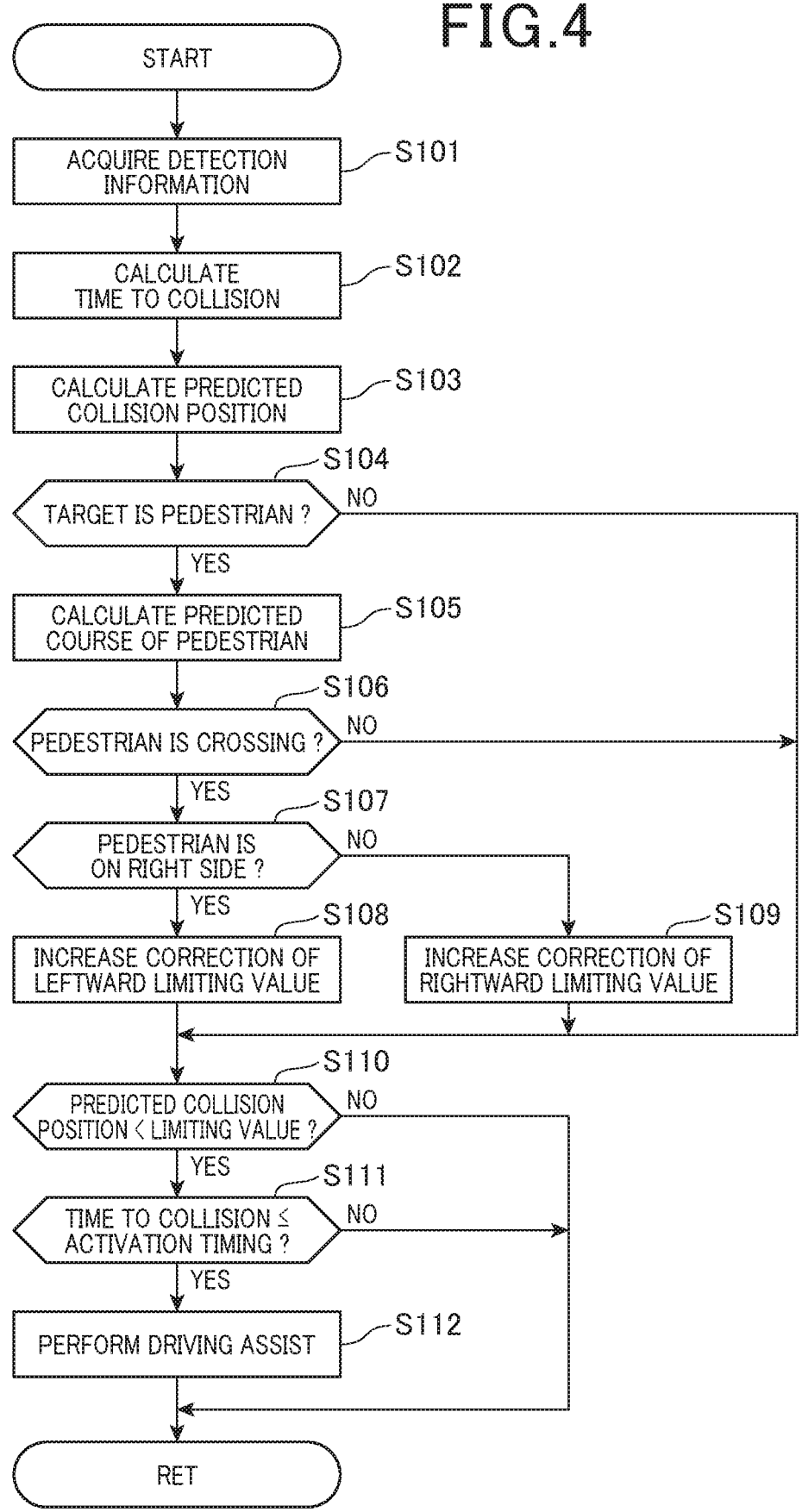
FIG. 4 is a flow diagram illustrating a process performed by the vehicle control apparatus in the first embodiment.

With reference to FIG. 4, the following description will discuss a series of processes performed by the driving assist ECU 10 of the present embodiment. The processes shown in FIG. 4 are performed, for each predetermined control cycle, with respect to each target present ahead of the own vehicle 40 in traveling direction. Further, the processes are also performed with respect to each function of the safety device. The control cycles of the processes can be the same as or different from the control cycles of the radar device 21 and the image capturing device 22.

First, in the driving assist ECU 10, the target recognizing unit 11 acquires the detection information (detected value of the position) of the target (S101). Specifically, in the driving assist ECU 10, the following processes are performed by the target information acquiring unit 12. The target information acquiring unit 12 calculates the position (lateral position and longitudinal position) and the velocity (lateral velocity and longitudinal velocity) of the target relative to the own vehicle 40, based on the first detection information (result of calculation of a position) obtained from the radar device 21 and the second detection information (result of extraction of a characteristic point) obtained from the image capturing device 22. Further, the target information acquiring unit 12 performs pattern matching with respect to the target, and then determines the type of the target based on the result of the pattern matching. The target information acquiring unit 12 acquires these results as target information. Then, in the driving assist ECU 10, the TTC calculating unit 13 calculates a time to collision, which is a predicted time until the own vehicle 40 collides with the target (S102). Specifically, the TTC calculating unit 13 calculates a time to collision, based on a longitudinal position and a longitudinal velocity of the target included in the target information. Then, in the driving assist ECU 10, the predicted collision-position calculating unit 14 calculates a predicted collision position that is a position at which the target is predicted to collide with the own vehicle 40 (S103). Specifically, the predicted collision-position calculating unit 14 estimates a movement path of the target based on the previous lateral position of the target, which has been recorded as a position history and a current lateral position of the target included in the target information, and then calculates a predicted collision position from the result of the estimation. Then, in the driving assist ECU 10, the crossing determining unit 15 determines whether the target is a pedestrian 50 (S104). Specifically, the crossing determining unit 15 determines whether the target is the pedestrian 50, based on the result of the determination included in the target information. If the target is a pedestrian 50 (YES in S104), the crossing determining unit 15 calculates a predicted path of the pedestrian 50 (S105). Note that, the predicted course to be calculated is a line segment connecting the current lateral position of the pedestrian 50 and the predicted collision position. Then, the crossing determining unit 15 determines whether the pedestrian 50 is crossing ahead of the own vehicle 40 in the traveling direction (course) of the own vehicle 40 (S106). Specifically, the crossing determining unit 15 determines whether the predicted course of the pedestrian 50 intersects with the course of the own vehicle 40, thereby determining whether the pedestrian 50 is crossing ahead of the own vehicle 40 in the traveling direction. Consequently, in the driving assist ECU 10, if the crossing determining unit 15 determines that the pedestrian 50 is crossing ahead of the own vehicle 40 in the traveling direction (YES in S106), the limit value setting unit 16 performs the following process. The limit value setting unit 16 determines whether the current lateral position of the pedestrian 50 is present in the right or left side extending from the center axis of the own vehicle 40 toward a direction ahead of the own vehicle in the travelling direction (S107). Determining that the current lateral position of the pedestrian 50 is present in the right side (YES in S107), the limit value setting unit 16 corrects the leftward limit value XL of the determination region to be a greater value (increase correction) (S108). The reason for performing the process for increasing the width of the left side determination region is that, the pedestrian 50 moves from right to left ahead of the own vehicle 40 in the traveling direction, and therefore the pedestrian 50 is predicted to collide with the own vehicle 40 at the vicinity of the left side front end of the own vehicle 40. Further, determining that the current lateral position of the pedestrian 50 is present in the left side (NO in S107), the limit value setting unit 16 corrects the rightward limit value XR of the determination region to be a greater value (increase correction) (S109). The reason for performing the process for increasing the width of the right side determination region is that, the pedestrian 50 moves from left to right ahead of the own vehicle 40 in the traveling direction, and therefore the pedestrian 50 is predicted to collide with the own vehicle 40 at the vicinity of the right side front end of the own vehicle 40. Thus, the limit value setting unit 16 performs the above correction to the limit value of the determination region opposite to the region at which the pedestrian 50 is located, and resets the limit value to be the corrected limit value, thereby increasing the determination area.

If the target is not a pedestrian 50 (NO in S104), the driving assist ECU 10 does not perform the correction for increasing the rightward limit value XR and the leftward limiting XL (process for increasing the width of the determination area), and sets each rightward limit value XR and leftward limit value XL to be the reference value Xb. The same applies to the case where it is determined that the pedestrian 50 is not crossing ahead of the own vehicle 40 in the traveling direction (NO in S106). In S107, the predicted collision position may be used for the determination instead of using the current lateral position of the pedestrian 50. In this case, the limit value of the determination region at which the predicted collision position is present may be corrected to be increased.

Then, in the driving assist ECU 10, the presence determining unit 17 compares the predicted collision position of the target and the limit value of the determination region to determine whether the predicted collision position is in the range of the limit value (in the determination region) (S110). Specifically, if the predicted collision position of the target is in the range of the limit value, the presence determining unit 17 determines that the predicted collision position is inside the determination region, thereby determining that the target is present within the course of the own vehicle 40. However, if the predicted collision position of the target is not in the range of the limit value, the presence determining unit 17 determines that the predicted collision position is outside the determination region, thereby determining that the target is not present within the course of the own vehicle 40. In the driving assist ECU 10, if the presence determining unit 17 determines that the predicted collision position of the target is in the range of the limit value (YES in S110), the activation determining unit 18 determines whether the calculated TTC is not more than the timing of activation (S111). That is, the activation determining unit 18 determines whether the TTC has reached the timing of activation. Specifically, if the TTC is not more than the timing of activation (TTC is shorter than the timing of activation), and the TTC has reached the timing of activation, the activation determining unit 18 determines to activate the safety device. However, if the TTC is more than the timing of activation (TTC is longer than the timing of activation), and the TTC has not reached the timing of activation, the activation determining unit 18 determines not to activate the safety device. Consequently, in the driving assist ECU 10, if the activation determining unit 18 determines that the TTC is no more than the timing of activation (TTC has reached the timing of activation) (YES in S111), the control processing unit 19 activates the safety device to perform driving assist (S112). Then the driving assist ECU 10 terminates the series of processes. Specifically, the activation determining unit 18 transmits the result of the determination (activation determination signal) to the control processing unit 19, and then the control processing unit 19 transmits the a control signal to the safety device to be activated based on the received result of the determination. This causes the safety device to be activated. However, if the activation determining unit 18 determines that the TTC is more than the timing of activation (TTC has not reached the timing of activation) (NO in S111), the driving assist ECU 10 terminates the series of processes. Further, if the presence determining unit 17 determines that the predicted collision position of the target is not in the range of the limit value (i.e. is outside of the range of the limit value) (NO in S110), the driving assist ECU 10 also terminates the series of processes.

The aforementioned configuration of the vehicle control apparatus (driving assist ECU 10) of the present embodiment provides the following effects.

The pedestrian 50 crossing (moving across) the course of the own vehicle 40 may suddenly change his/her moving velocity due to stopping in the course of the own vehicle 40 or the like. In such cases, it is difficult for the driver to avoid a collision with the pedestrian by a steering operation or the like. In the present embodiment, one of the left and right limit values that limits the width of a determination region to which the pedestrian 50 moves is corrected to be a greater value (increase correction) to increase the width of the determination region when the pedestrian 50 crosses ahead of the own vehicle 40 in the traveling direction. Accordingly, with the vehicle control apparatus of the present embodiment, the pedestrian 50 having a high risk of a collision with the own vehicle 40 is determined with high probability (is likely to be determined) as a pedestrian present within the course of the own vehicle 40. Thus, the vehicle control apparatus of the present embodiment prevents the safety device from not being activated when required to be activated to avoid a risk.

When the pedestrian 50 moves ahead of the own vehicle 40 in the traveling direction but does not cross the course of the own vehicle 40, the driver can easily avoid a collision with the pedestrian by a steering operation. Alternatively, the pedestrian 50 may take on the behavior of avoiding a collision with the own vehicle. In such cases, activation of the safety device results in an unnecessary activation (being activated when not required to be activated). In the present embodiment, when the pedestrian 50 does not cross the course of the own vehicle 40, the process for increasing the width of the determination region (correction for increasing the limit value) is not performed. Accordingly, with the vehicle control apparatus of the present embodiment, a pedestrian 50 having a low risk of a collision with the own vehicle 40 is determined with low probability (is less likely to be determined) as a pedestrian present within the course of the own vehicle 40. Thus, the vehicle control apparatus of the present embodiment prevents an unnecessary activation of the safety device.

Second Embodiment

The vehicle control apparatus of the present embodiment has an overall configuration common to the vehicle control apparatus of the first embodiment, but differs in part of processes from the vehicle control apparatus of the first embodiment. Specifically, in the present embodiment, the processes performed by the crossing determining unit 15 and the limit value setting unit 16 included in the driving assist ECU 10 that is a vehicle control apparatus differ in part from the vehicle control apparatus of the first embodiment (other processes are partially extra processing may be performed). For example, the road on which the own vehicle 40 travels includes not only a straight section (straight road) but also a curved section (curved road). In the present embodiment, taking into account that the case where the own vehicle 40 is travelling on the road in the curved section (course of the own vehicle 40 is a curve), the limit value setting unit 16 performs a correction for increasing the limit value (process for increasing the width of the determination region). Specifically, in the present embodiment, the crossing determining unit 15 performs a process for determining crossing with use of a center line that is a straight line passing through the central position relative to the position of the lateral side (left and right side) of the own vehicle 40.

Figure 5:
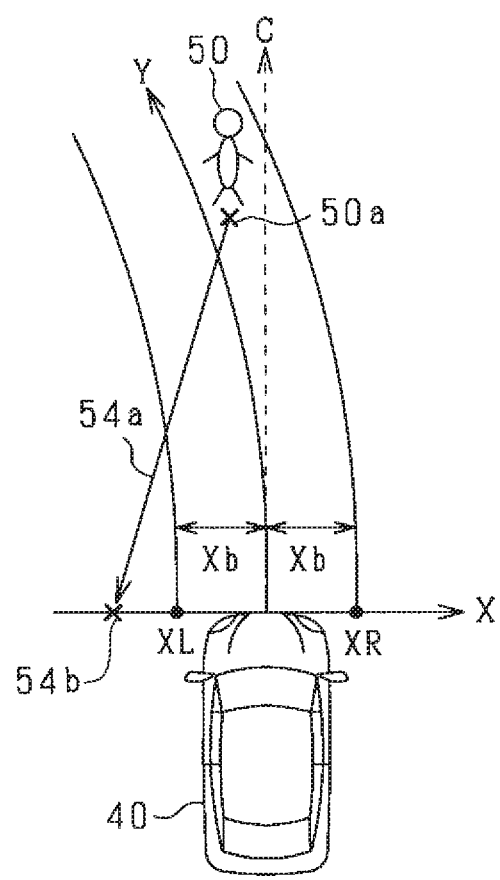
FIG. 5 is a diagram illustrating a predicted course of a pedestrian and a process for correcting a limit value to a greater value (process for increasing the width of a determination region) in a second embodiment.

As shown in FIG. 5, it is assumed that the own vehicle 40 is travelling on the road curved to the left (left curved road), and the current position 50a of the pedestrian 50 is present in the left side relative to a center line C, and the predicted collision position 54b is also present in the left side relative to the center line C. In such cases, although a predicted course 54a of the pedestrian 50 intersects with the course (y-axis) of the own vehicle 40, the driver can avoid a collision by operating steering to the right. Alternatively, the pedestrian 50 can avoid a collision by increasing his/her moving velocity. In this case, performing the correction for increasing the leftward limit value XL (the process for increasing the width of the left side determination region) may cause the predicted collision position 54b to be in the determination region (within the limit value), resulting in an unnecessary activation of the safety device. Therefore, the limit value setting unit 16 of the present embodiment does not perform the correction for increasing the limit value (the process for increasing the width of the determination region) when the course of the own vehicle 40 is curved, and the current position of the pedestrian 50 and the predicted collision position are in the above relationship.

On the other hand, it is assumed that the current position 50a of the pedestrian 50 is present in the right side relative to the center line C. Further, the pedestrian 50 is assumed to cross ahead of the own vehicle 40 in the traveling direction, and therefore the predicted collision position 54b is present in the left side relative to the course (y-axis) of the own vehicle 40. In such cases, it is difficult for the driver to judge whether a steering operation direction toward which the steering operation should be performed is leftward or rightward. Therefore, in this case, the limit value setting unit 16 of the present embodiment performs the correction for increasing the limit value of the determination region in which the predicted collision point 54b is present, similarly to the first embodiment.

The aforementioned configuration of the vehicle control apparatus (driving assist ECU 10) of the present embodiment provides the effects equivalent to the first embodiment.

Modified Examples

According to the aforementioned embodiments, the course of the own vehicle 40 is calculated based on the image captured by the image capturing device 22; however, the configuration is not limited to this. According to a modified example, the course of the own vehicle 40 may be calculated based on the result of detection of a structure on the road detected by the radar device 21. If the own vehicle 40 includes a yaw rate sensor, the course of the own vehicle 40 may be calculated based on the value detected by the yaw rate sensor. Further, the course of the own vehicle 40 may be calculated by using each of the above plurality of detection methods, and then the average obtained from the plurality of the detection methods may be determined to be an ultimate course of the own vehicle 40.

According to the aforementioned embodiments, the predicted course of the pedestrian 50 is calculated based on the current position of the pedestrian 50 and the predicted collision position. Specifically, according to the aforementioned embodiments, the predicted collision position is calculated based on the position history of the pedestrian 50, which has been recorded over a predetermined time period; however, the configuration is not limited to this. According to a modified example, the predicted course of the pedestrian 50 may be calculated by using the velocity of the pedestrian 50 relative to the own vehicle 40. In this case, the predicted course of the pedestrian 50 may be calculated by using the current position and the current relative velocity of the pedestrian 50, not using the position history of the pedestrian 50.

According to the aforementioned embodiments, determination whether the pedestrian 50 is present within the course of the own vehicle 40 (determination whether the safety device is to be activated) is performed based on the predicted collision position; however, the configuration is not limited to this. According to a modified example, if the both current position of the pedestrian 50 and the predicted collision position are in the range of the limit value (in the determination region), the pedestrian 50 may be determined to be present within the course of the own vehicle 40, resulting in activation of the safety device.

According to the aforementioned embodiments, the case where the target is the pedestrian 50 and the pedestrian 50 is crossing the course of the own vehicle 40 is set as a condition where the correction for increasing the limit value (process for increasing the width of determination region) is performed; however, the configuration is not limited to this. According to a modified example, the correction for increasing the limit value may be performed only when the distance between the lateral side of the own vehicle 40 and the predicted collision position is within the predetermined value. Thus, according to the aforementioned embodiments, an unnecessary activation of the safety device is further prevented.

According to the aforementioned embodiments, the correction for increasing the limit value (process for increasing the width of the determination region) is performed by adding the correction value $\Delta X$. For example, a large relative velocity (lateral velocity) of the pedestrian 50 relative to the own vehicle 40 increases calculation errors of the predicted collision position. Further, under such a condition, sudden stopping of the pedestrian 50 may result in a collision with high probability. Therefore, according to a modified example, as the pedestrian 50 has a large lateral velocity, a greater correction value $\Delta X$ may be used for the correction for increasing the limit value.

As the TTC is shorter, the probability of a collision between the own vehicle 40 and the pedestrian 50 is increased. Similarly, as the relative velocity or the vehicle velocity is larger, the probability of a collision between the own vehicle 40 and the pedestrian 50 is increased. Therefore, according to a modified example, the correction for increasing the limit value may be performed by using different correction values $\Delta X$ based on the TTC, the relative velocity, the vehicle velocity (velocity of the own vehicle 40 that can be detected by the vehicle velocity sensor 23) to reset the limit value. In this case, performing the correction for increasing the limit value without setting an upper limit of the limit value may result in an unnecessary operation of the safety device. Accordingly, the upper limit of the increase correcting may be set. The upper limit can be set by setting the width of the determination region detected by the radar device 21 as an upper limit of the increase correction.

According to a modified example, the correction value $\Delta X$ used for the correction for increasing the limit value (process for increasing the width of the determination region) may be changed for each function of the safety device. For example, when the notification device 31 is activated, the driver may be notified the risk of a collision, and then may perform the operation for avoiding the collision. Therefore, in this case, the brake device 32 may not need to be activated. In such cases, the correction for increasing the limit value may be performed only for the notification device 31. Further, the correction value ΔX for the notification device 31 may be changed to be a greater value.

According to the aforementioned embodiments, the vehicle control apparatus of the present disclosure is applied to the vehicle driven by a person in the vehicle; however, the configuration is not limited to this. The vehicle control apparatus of the present disclosure is similarly applicable to, for example, a vehicle automatically driven by an ECU or the like. In this case, the functions of the activation determining unit 18 and the control processing unit 19 are not applied to the notification device 31 and the brake assist function of the brake device 32. The functions of the activation determining unit 18 and the control processing unit 19 may be applied to the automatic brake function of the brake device 32.

According to the aforementioned embodiments, the notification device 31 and the brake device 32 are provided as safety devices to be controlled; however, the safety devices to be controlled are not limited to these.

10: Driving assist ECU
11: Target recognizing unit
12: Target information acquiring unit
13: TTC calculating unit
14: Predicted collision-position calculating unit
15: Crossing determining unit
16: Limit value setting unit
17: Presence determining unit
18: Activation determining unit
19: Control processing unit

The invention claimed is:

1. A vehicle control apparatus comprising:
a target information acquiring unit which acquires a current position of a pedestrian present ahead of an own vehicle in a traveling direction, the current position being a position relative to the own vehicle;
a predicted collision-position calculating unit which calculates a position at which a distance between the pedestrian and the own vehicle becomes zero in a travelling direction of the own vehicle as a predicted collision position based on the current position;
a crossing determining unit which determines whether the pedestrian is crossing a course of the own vehicle;
a limit value setting unit which sets a limit value indicating a width of a determination region in a lateral direction perpendicular to the travelling direction of the own vehicle in the determination region for determining whether the pedestrian is present within the course of the own vehicle; and
a presence determining unit which determines whether the pedestrian is present within the course of the own vehicle based on the predicted collision position and the limit value, wherein
the limit value setting unit corrects one of left and right limit values of the determination region in which the predicted collision position is present in the travelling direction of the own vehicle to be greater than the limit value of the other side to perform an increase process for increasing a width of the determination region in response to the presence determining unit determining that the pedestrian is crossing the course of the own vehicle.

2. The vehicle control apparatus according to claim 1, wherein the crossing determining unit terminates the increase process based on a fact that the crossing determining unit has terminated a determination of crossing of the pedestrian.

3. The vehicle control apparatus according to claim 1, wherein the crossing determining unit determines that the pedestrian is crossing a course of the own vehicle when a course of the own vehicle intersects with a course of the pedestrian.

4. The vehicle control apparatus according to claim 1, wherein the crossing determining unit determines that the pedestrian is crossing a course of the own vehicle when the current position is present on one of a left and right sides relative to the course of the own vehicle, and the predicted collision position is present in the other side.

5. The vehicle control apparatus according to claim 1, wherein the limit value setting unit performs the increase process when the pedestrian is located on a right side relative to a center line passing a center position relative to a position of a lateral side of the own vehicle, and is moving to a left side relative to a course of the own vehicle, or when the pedestrian is located at a left side relative to the center line, and is moving to a right side relative to the course of the own vehicle.

6. The vehicle control apparatus according to claim 1, wherein the target information acquiring unit acquires a velocity of the pedestrian in the lateral direction perpendicular to the travelling direction of the own vehicle, and
the limit value setting unit sets the limit value to be a greater value in the increase process as the velocity becomes larger.

7. A method of controlling a vehicle which method is performed by a vehicle control apparatus,
the method comprising the steps of: acquiring a current position of a pedestrian present ahead of an own vehicle in a traveling direction, the current position being a position relative to the own vehicle;
calculating a position at which a distance between the pedestrian and the own vehicle becomes zero in a travelling direction of the own vehicle as a predicted collision position based on the current position;
determining whether the pedestrian is crossing a course of the own vehicle;
setting a limit value indicating a width of a determination region in a lateral direction perpendicular to the travelling direction of the own vehicle in the determination region for determining whether the pedestrian is present within the course of the own vehicle; and
determining whether the pedestrian is present within the course of the own vehicle based on the predicted collision position and the limit value,
in the limit value setting step, one of left and right limit values of the determination region in which the predicted collision position is present in the travelling direction of the own vehicle is corrected to be greater than the limit value of the other to perform an increase process for increasing a width of the determination region in response to determining that the pedestrian is crossing the course of the own vehicle.

* * * * *